(12) United States Patent
Nakamura

(10) Patent No.: US 7,456,937 B2
(45) Date of Patent: Nov. 25, 2008

(54) RADAR APPARATUS

(75) Inventor: Mitsuo Nakamura, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/821,117

(22) Filed: Jun. 21, 2007

(65) Prior Publication Data

US 2008/0030398 A1 Feb. 7, 2008

(30) Foreign Application Priority Data

Jul. 25, 2006 (JP) .............................. 2006-202577

(51) Int. Cl.
*G01C 3/08* (2006.01)
(52) U.S. Cl. .................................... 356/4.01
(58) Field of Classification Search ....... 356/3.01–3.15, 356/4.01–4.1, 5.01–5.15, 6–22
See application file for complete search history.

(56) References Cited

U.S. PATENT DOCUMENTS

| 6,587,185 B1 * | 7/2003 | Ide et al. ..................... 356/5.01 |
| 7,012,237 B1 * | 3/2006 | Ake ....................... 250/214 A |
| 2004/0169840 A1 | 9/2004 | Hoashi et al. |
| 2005/0200833 A1 | 9/2005 | Nakamura et al. |

\* cited by examiner

*Primary Examiner*—Thomas H Tarcza
*Assistant Examiner*—Luke D Ratcliffe
(74) *Attorney, Agent, or Firm*—Harness, Dickey & Pierce, PLC

(57) ABSTRACT

A radar apparatus includes an error correction section and a distance calculation section. The error correction section corrects an estimate error of a peak center estimate time which is caused by deviation of an actual peak center generation time in a light receiving signal from sampling of an A/D conversion section. The distance calculation section calculates a distance to a reflective object from a corrected peak center estimate time that is corrected by the error correction section.

9 Claims, 6 Drawing Sheets

RADAR APPARATUS

CROSS REFERENCE TO RELATED APPLICATION

This application is based on and incorporates herein by reference Japanese Patent Application No. 2006-202577 filed on Jul. 25, 2006.

FIELD OF THE INVENTION

The present invention relates to a radar apparatus, which irradiates plural transmitting waves over a given angle range and detects a reflective object on the basis of received signals of reflected waves corresponding to the respective transmitting waves. The present invention is applicable to a vehicle and other systems.

BACKGROUND OF THE INVENTION

For example, a radar apparatus is disclosed in US 2005/0200833 (JP 2005-257405A). According to this radar apparatus, a laser beam is irradiated from a laser diode according to a drive signal from a laser radar CPU, and a reflective light corresponding to the laser beam is received by a light receiving element. The light receiving element outputs a voltage signal (light receiving signal) corresponding to the intensity of the received reflective light, and converts the outputted light receiving signal to a digital signal by means of an A/D conversion section which samples and A/D-converts the voltage signal. In a timer section following the A/D conversion section, an integration signal is obtained by integrating the light receiving signals which have been converted into the digital signals, and time of generation of a peak value of the peak waveform which is obtained from a noise reference value is obtained. In this example, when the time of generation of the peak value is obtained, a peak center estimate (period estimate) is conducted as follows.

As shown in FIG. 12, the maximum intensity of the A/D conversion results at a sampling point of the light receiving signal (time point when sampling is conducted by the A/D conversion) is detected, and the maximum intensity is multiplied by a given coefficient k (k is a coefficient that is equal to or lower than 1, for example, 0.5) as represented by the following expression to set a threshold value Ith.

$$\text{Threshold value Ith} = (\text{Maximum intensity}) \times k \, (0 < k < 1) \tag{Ex. 1}$$

When the threshold value is set by calculation of EX. 1, the threshold value is compared with the intensities of the A/D conversion results at each of the sampling points. With the comparison, the A/D conversion results of two points between which the threshold value is interposed are detected at two portions of a leading portion and a trailing portion of the light receiving signal waveform. As a result, as shown in FIG. 13, two successive points (t1, a1) and (t2, a2) are detected between which the threshold value Ith lies at the leading or rising portion of the light receiving signal waveform. Likewise, two points (t3, a3) and (t4, a4) are detected between which the threshold value Ith lies at the trailing or falling portion of the light receiving signal waveform. Reference ti (i=1, 2, 3, 4) represents a time from the light emission start at the sampling points, and ai (i=1, 2, 3, 4) represents the A/D conversion results at the sampling points.

Then, a leading time T1 and a trailing time T2 when it is assumed that the waveform of the received signal crosses the threshold value Ith are calculated by the aid of the four detected points. More specifically, the leading time T1 and the trailing time T2 are found by calculating the expression of linear interpolation represented by the following expression.

$$T1 = (\text{Ith} - a1) \times (t2 - t1)/(a2 - a1) + t1 \tag{Ex. 2}$$

$$T2 = (a3 - \text{Ith}) \times (t4 - t3)/(a3 - a4) + t3 \tag{Ex. 3}$$

The time of the peak center is estimated by calculating the following expression on the basis of the calculation results of the leading time T1 and the trailing time T2.

$$\text{Peak center estimated time} = (T1 + T2)/2 \tag{Ex. 4}$$

When the peak center estimated time is obtained by calculating the above Expression 4, a time difference Δt between a laser beam emission start time and a peak center estimated time is calculated. Thereafter, a distance to the reflective object is calculated by calculating the following expression on the basis of the time difference Δt that is outputted from a time measurement section in the laser radar CPU.

$$\begin{aligned}\text{Distance [m]} &= \text{Light speed[m/ns]} \times \Delta t[\text{ns}]/2 \\ &= 0.15 \, [\text{m/ns}] \times \Delta t[\text{ns}]\end{aligned} \tag{Ex. 5}$$

This distance calculation still includes some errors and hence need be improved to be more accurate.

SUMMARY OF THE INVENTION

It is an object of the present invention to provide a radar apparatus that is capable of reducing a distance calculation error arising from sampling of a light receiving signal.

The present invention is based on the following analysis. As understood from FIG. 11, in which A/D conversion results of a light receiving signal are plotted, it is found that sampling is conducted while skipping some portions because sampling intervals in the A/D conversion are not sufficiently fine but not fine as compared with the peak width of the light receiving signal. The respective points in the figure represent sampled portions (A/D conversion results at each of the sampling points), and an interpolation curve is connected between the respective adjacent or successive sampling points for descriptive purposes.

A actual peak center of the light receiving signal is not sampled. As described above, it is found that the possibility that the actual peak center is not sampled is sufficiently high in the light receiving signal that is not subjected to the A/D conversion at the sufficiently fine sampling intervals with respect to the peak width of the light receiving signal.

Therefore, when the actual sampling frequency is increased, the possibility that the peak center can be sampled is increased by fining the sampling intervals. However, because there is a limit in the circuit of the radar apparatus, the peak center is detected by a predetermined limited sampling frequency without increasing the sampling frequency. For the above reason, it is necessary to estimate the peak center of the reflected wave on the basis of the A/D conversion results that have been sampled while skipping some portions with high precision.

In the radar apparatus in US 2004/0169840, it is found from the above Expression 5 that an estimate precision of the peak center estimate time which is calculated from Expression 4 is a distance precision per se which is outputted from the radar apparatus. Under the circumstances, when the estimate precision of the peak center estimate time is studied, it is understood that there arises the following problem.

As shown in FIG. 14, in which a waveform having a peak center corresponding to the sampling point, and a waveform having no peak center corresponding to the sampling point are plotted at the same time. FIG. 14 shows a Gauss waveform represented by the following expression as an example of an understandable waveform. Symbol "b" in the following expression represents the peak center position.

$$\text{Waveform }(t) = \exp\{-a \times (t-b) \times (t-b)\} \quad \text{(Ex. 6)}$$

Referring to FIG. 14, the dotted lines that are in parallel to the axis of ordinate represent sampling points Ts1, Ts2, Ts3, Ts4, etc. and cross points of the dotted lines that are in parallel to the axis of ordinate and the two waveforms are the A/D conversion values. The left waveform has a first peak center PC1 located at the sampling position Ts3, and the right waveform has a second peak center PC2 not located at the sampling positions Ts3, Ts4. FIG. 15 is a graph showing the A/D conversion results (dots on the graph) of the same waveform as the graph shown in FIG. 14, which are connected by interpolation curves, and plots the A/D conversion results on the original waveforms shown with solid lines.

As shown in FIG. 15, in the case of the left waveform whose peak center PC1 is sampled, the waveform that connects the A/D conversion values by the interpolation curve substantially coincides in the configuration with the original waveform. A peak center estimate time that is estimated by calculating the above Expression 4 on the basis of a threshold value Th1 and four A/D conversion results coincides with the actual peak center PC1.

However, in the case of the right waveform whose peak center PC2 is not located to be sampled, it is found that the waveform that connects the A/D conversion values by the interpolation curve is different in the configuration from the original waveform. Also, because the peak center PC2 is not sampled, the maximum intensity that is substituted in the above Expression 1 is smaller than the actual peak maximum value, and the threshold value Th2 is smaller than the threshold value Th1 under the calculation.

The fact that the peak center time (position) that is calculated by the above Expression 4 does not coincide with the actual peak center time (position) is clearly understood from asymmetry of the waveform configuration that is connected by the interpolation curve shown in FIG. 15. That is, because the values of a leading time T1 and a trailing time T2 are asymmetric with respect to the center, the calculation results of the Expression 4 are deviated from the center.

FIG. 16 shows a relationship between a deviation (error) between the peak center estimate time and the actual peak center time, and the sampling time. The relationship is theoretically calculated from the above Expressions 1 to 5. In this figure, a value of k in the above Expression 2 is 0.625, and the sampling frequency is 40 [MHz] (a period of 25 [ns]).

The deviation between the peak center estimate time and the actual peak center time in the case where the peak center is shifted by 1.25 [ns] unit in 25 [ns] of one period. In the figure, the axis of abscissa represents a time when the actual peak center exists (timing from a sampling point), and the axis of ordinate represents the deviation (=error) between the peak center estimate time that is estimated by using the A/D conversion results at the peak position and the actual peak center time.

In the case where the time on the axis of abscissa is 0 [ns] and 25 [ns] (one period of 40 [MHz]), since the sampling point and the peak center position coincide with each other, the peak center estimate time and the actual peak center coincide with each other, and the deviation (=error) of the estimate time is zero (0). On the other hand, in the case where the time on the axis of abscissa is not 0 [ns] or 25 [ns] (one period of 40 [MHz]), since all of the peak center positions are deviated from the sampling points, the waveform is distorted as indicated by the waveform that is connected by the interpolation curve in FIG. 15. As a result, an error is included in the peak center estimate time. It is found that the error is a function with a time difference between the actual peak center position and the sampling point as a variable. That is, the error is not a constant value, but changes depending on the peak center position.

As shown in FIG. 16, an error range of the peak center estimate time is about ±1.62 [ns]. When the error of the peak center estimate time is converted into an error of the distance on the basis of Expression 5, it is found that the error varies in the form of a sine curve within a range of ±0.243 [m] as represented by the following expression.

$$\text{Error of distance} = \pm 1.62 \times 0.15 = \pm 0.243 \text{ [m]}$$

The error of distance is caused by the fact that the sampling points of the A/D conversion skip some portions (sampling is not fine) with respect to the peak width of the receiving signal waveform. This is a problem that always occurs on an actual circuit with a limit of the sampling frequency.

When the above problem is reviewed from the viewpoint of a precision in the distance calculation of the radar apparatus, the distance error appears in the configuration shown in FIG. 16 by the position of an object to be detected (=peak center position). Also, the distance error is repeated in the same period as the sampling period.

More specifically, in the case where the position of the object to be detected (the peak center of the light receiving signal waveform) is located on the sampling point, the distance error is zero (0). In the case where the object to be detected exists at ¼ of the sampling frequency, the distance error becomes maximum (0.243 [m]). The maximum value is obtained in the case where the light receiving signal waveform is the configuration of the Gauss waveform represented by Expression 6. However, since the actual light receiving signal waveform is different from the Gauss waveform, a value of the error is also different.

Because the error is required to be within a given range (ideally, the error is zero) regardless of the position of the object to be detected as the radar apparatus, variation in error in the distance to the object to be detected is a problem of the distance calculation precision of the radar apparatus.

According to the present invention, therefore, a radar apparatus irradiates a transmitting wave in a given angle area, receives reflected wave of the transmitting wave reflected by a reflective object, and outputs a receiving signal corresponding to an intensity of the reflected wave. The radar apparatus samples the receiving signal and converts the sampled receiving signal into a digital signal. The radar apparatus estimates a peak center generation time in the receiving signal that is converted into the digital signal. The radar apparatus calculates a distance to the reflective object on the basis of a peak center estimate time that is estimated. The radar apparatus corrects an estimate error of the peak center estimate time, which is caused by deviation of the peak center generation time in the receiving signal from sampling time for the A/D conversion.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
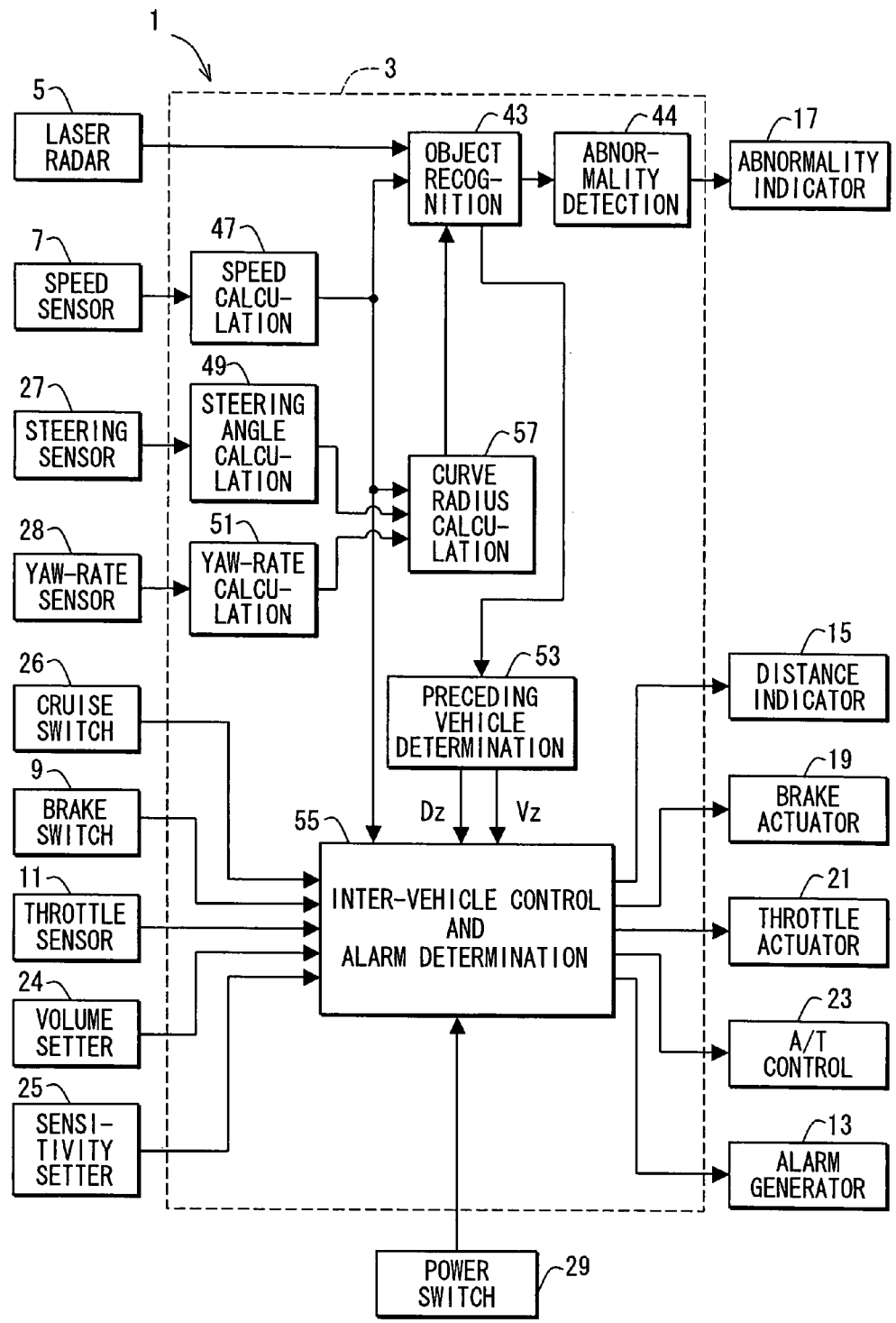
FIG. 1 is a section diagram showing a vehicle control system to which a radar apparatus according to the present invention is applied.

Referring to FIG. 1, a vehicle radar apparatus according to this embodiment is applied to a vehicle control device 1. The vehicle radar apparatus has a function of controlling a vehicle speed in order to issue an alarm in the case where an obstacle exists in an area within a given distance, or to keep an inter-vehicle distance to a preceding vehicle to a given inter-vehicle distance.

The vehicle control device 1 mainly includes a recognition/inter-vehicle control ECU 3. The control ECU 3 mainly includes a microcomputer, an input/output interface (I/O), various driver circuits and detector circuits. Those hardware configurations are well known, and therefore their description will be omitted.

The control ECU 3 receives detection signals from a laser radar sensor 5 as a vehicle radar apparatus, a vehicle speed sensor 7, a brake switch 9, and a throttle opening sensor 11.

The control ECU 3 also outputs drive signals to an alarm generator 13, a distance indicator 15, a sensor abnormality indicator 17, a brake actuator 19, a throttle actuator 21, and an automatic transmission (A/T) controller 23.

Also, the control ECU 3 is connected with an alarm volume setter 24 that sets an alarm volume, an alarm sensitivity setter 25 that sets the sensitivity in an alarm determination process, a cruise control switch 26, a steering sensor 27 that detects the operation amount of a steering wheel (not shown), and a yaw-rate sensor 28 that detects a yaw rate generated in a vehicle. Also, the control ECU 3 has a power switch 29, and starts given processing upon turning on the power switch 29.

Figure 2:
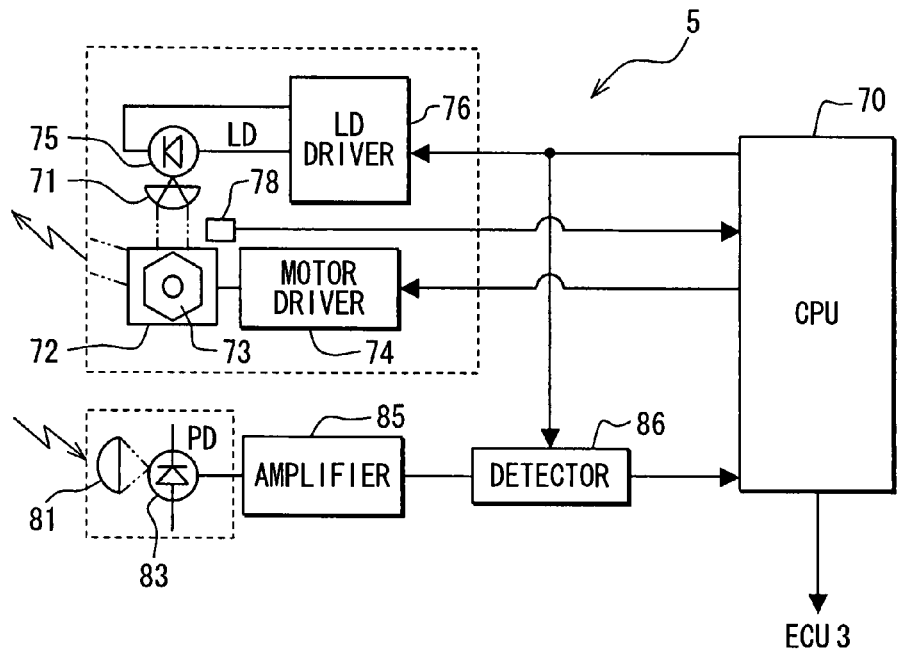
FIG. 2 is a section diagram showing a laser radar sensor used in an embodiment of the present invention.

The laser radar sensor 5 is mainly includes, as shown in FIG. 2, a light emission section, a light receiving section, and a laser radar CPU 70. The light emission section includes a semiconductor laser diode 75 that irradiates a pulsed laser beam through a light emission lens 71 and a scanner 72. Further, the laser diode 75 is connected to the laser radar CPU 70 through a laser diode driver circuit 76, and irradiates or emits a laser beam according to a drive signal from the laser radar CPU 70. Also, the scanner 72 is equipped with a polygon mirror 73 rotatable about a vertical axis. When the drive signal from the laser radar CPU 70 is inputted to a motor driver section 74, the polygon mirror 73 is rotated by a drive force from a motor (not shown). The rotation position of the motor is detected by a motor rotation position sensor 78, and outputted to the laser radar CPU 70.

Figure 4:
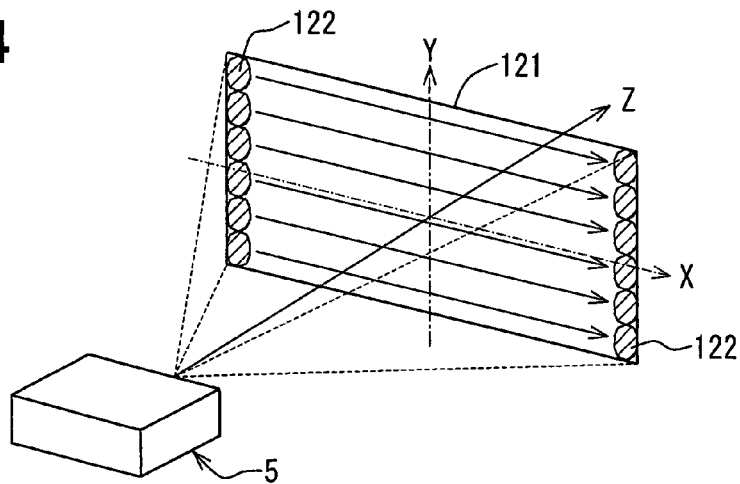
FIG. 4 is a perspective view showing irradiated regions of the laser radar sensor.

Because the polygon mirror 73 has six mirrors different in slant angle, the polygon mirror 73 is capable of outputting a laser beam so as to discontinuously scan the respective given angular ranges in the vehicle width direction and the vehicle height direction with the laser beam. Thus, the laser beam is two-dimensionally scanned as shown in FIG. 4. In FIG. 4, patterns 122 of the emitted laser beam show only a case in which the laser beam is emitted to the right end and the left end within a detection area 121 of a reflective object, and the patterns between the right end and the left end are omitted in the figure. The emitted laser beam patterns 122 are substantially oval, but are not limited to this configuration, and can be rectangular. The embodiment is not limited to the scanning system but can be applied to a system that is capable of measuring two orientations in addition to the distance.

As shown in FIG. 4, when the irradiation direction of the laser beam is a Z-axis, the laser beam is irradiated so as to sequentially scan an X-Y plane perpendicular to the Z-axis with the laser beam. In this embodiment, a Y-axis that is a height direction is a reference direction, and an X-axis that is a vehicle width direction is a scanning direction. The laser beam is irradiated by 327 points while shifting the scanning direction every given angle in the X-axis direction, and the irradiation of 327 points in the X-axial direction is repeated by six scanning lines in the Y-axial direction. Therefore, plural laser beams are irradiated in each of the scanning lines of a first scanning line to a sixth scanning line.

As described later, with the irradiation of the detection area 121 with the laser beam, in the case where a reflective light of the laser beam is received by the light receiving section, the laser radar CPU 70 calculates scan angles θx and θy indicative of the irradiation angles of the laser beam, and a measured distance L, and then outputs the calculated values to the control ECU 3. The two scan angles θx and θy are defined such that an angle between a line resulting from projecting the respective emitted laser beams onto a Y-Z plane and the X-axis is a vertical scan angle θy, and an angle between a line resulting from projecting the respective emitted laser beams onto an X-Z plane and the Z-axis is a horizontal scan angle θx.

The light receiving section of the laser radar sensor 5 is equipped with a condenser lens 81 that condenses the laser beam that is reflected by a reflective object not shown, and a light receiving element (photodiode) 83 that outputs a voltage signal (light receiving signal) corresponding to the intensity of the condensed reflective light. The light receiving signal that is outputted by the light receiving element 83 is amplified by an amplifier 85, and then inputted to a detector circuit 86 that detects the reflective object on the basis of the light receiving signal that has been converted into a digital signal. Hereinafter, the configuration and operation of the detector circuit 86 will be described.

Figure 3:
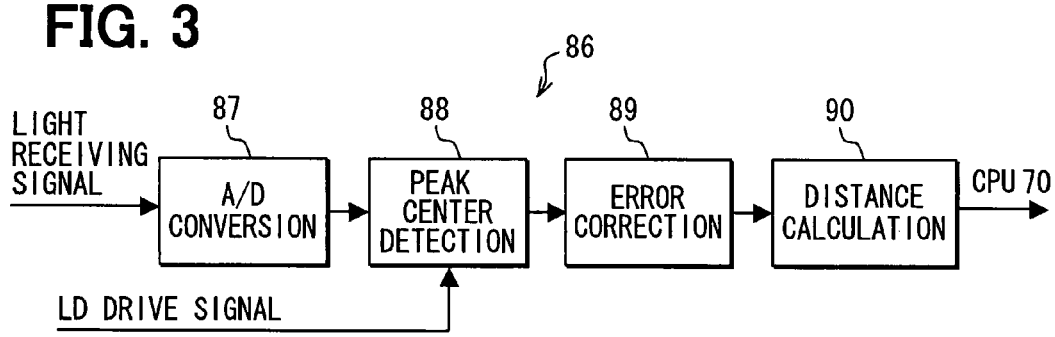
FIG. 3 is a section diagram showing a detector circuit used in the laser radar sensor.

As shown in FIG. 3, the detector circuit 86 includes an analog/digital (A/D) conversion section 87. The light receiving signal that is outputted from the amplifier 87 is inputted to the A/D conversion section 87, sampled at a given sampling frequency, and then converted into the digital signal. The light receiving signal that has been converted into the digital signal is inputted to a peak center detection section 88, and temporarily retained in the peak center detection section 88.

Figure 5:
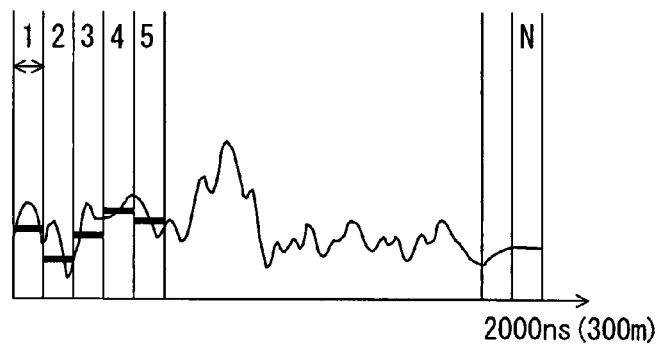
FIG. 5 is a waveform diagram explaining a digital conversion process with respect to a light receiving signal due to an A/D conversion in the detector circuit.

The light receiving signal that is converted into the digital signal is a signal that is outputted from the amplifier circuit 85 until a given period of time (for example, 2000 [ns]) is elapsed after the laser beam emitting time. As shown in FIG. 5, the A/D conversion section 37 divides the light receiving signal into N sections at given time intervals (for example, 25 [ns]), and converts an average value of the light receiving signals in each of the sections into a digital value.

The peak center detection section 88 estimates the peak center generation time in the light receiving signal which has been converted into the digital signal by means of the A/D converter 87 to detect the peak center estimate time. The estimating method of the peak center estimate time is the same as the method of calculating the above Expressions 1 to 4 to find the estimate time as disclosed in US 2004/0169840. Specifically, the maximum intensity of the A/D conversion results at the sampling points of the light receiving signals (timing when sampling is conducted by the A/D conversion section 87) is first detected, and the maximum intensity is multiplied by a given coefficient k (k is a coefficient of 1 or lower, for example, 0.5) to set a threshold value Ith.

$$\text{Threshold value Ith} = \text{Maximum Intensity} \times k (0 < k < 1) \quad \text{(Ex. 8)}$$

When Expression 8 is calculated to set the threshold value, the threshold value is compared with the intensity of the A/D conversion results. With the comparison, the A/D conversion results at two points between which the threshold value resides are detected at respective two portions of a leading portion and a trailing portion of the light receiving signal waveform. Then, two points (t1, a1) and (t2, a2), between which the threshold value Ith on the leading portion of the light receiving signal resides, are detected, and two points (t3, a3) and (t4, a4) between which the threshold value on the trailing portion of the light receiving signal resides. Symbol ti (i=1, 2, 3, 4) represents a time at the sampling point after the light emission starts, and ai (i=1, 2, 3, 4) represents the A/D conversion results at the sampling point.

Then, the detected four points are used to calculate a leading time T1 and a trailing time T2 at which it is estimated that the light receiving signal waveform crosses the threshold value Ith. More specifically, the leading time T1 and the trailing time T2 are found by calculating the following expressions of the linear interpolation.

$$T1 = (Ith - a1) \times (t2 - t1)/(a2 - a1) + t1 \quad \text{(Ex. 9)}$$

$$T2 = (a3 - Ith) \times (t4 - t3)/(a3 - a4) + t3 \quad \text{(Ex. 10)}$$

The peak center generation time is estimated by calculating the following expression on the basis of the calculation results of the leading time T1 and the trailing time T2.

$$\text{Peak center estimate time} = (T1 + T2)/2 \quad \text{(Ex. 11)}$$

As a result, the light receiving signal having a noise level that does not exceed the threshold value can be excluded from the signals to be used for the estimation of the peak center estimate time.

Figure 9:
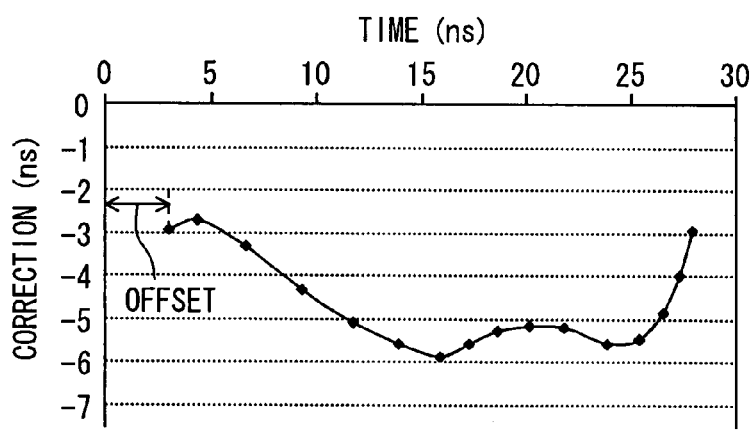
FIG. 9 is a diagram showing a correction map for correcting the peak center estimate time.

An error correction section 89 inputs the peak center estimate time that is outputted from the peak center detection section 88, and stores a data map indicative of the characteristics unique to the circuit configuration of the radar apparatus and an offset value therein as shown in FIG. 9 which will be described later. The error correction section 89 executes Expression 13 that will be described later with respect to the input of the peak center estimate time, and specifies a correction amount (correction time) for correcting the estimate error from the map shown in FIG. 9. Thereafter, the error correction section 89 executes the correction calculation of Expression 14 which will be described later. Then, the corrected peak center estimate time is outputted to the distance calculation section 90. Hereinafter, the correction of the peak center estimate time will be described.

Figure 6:
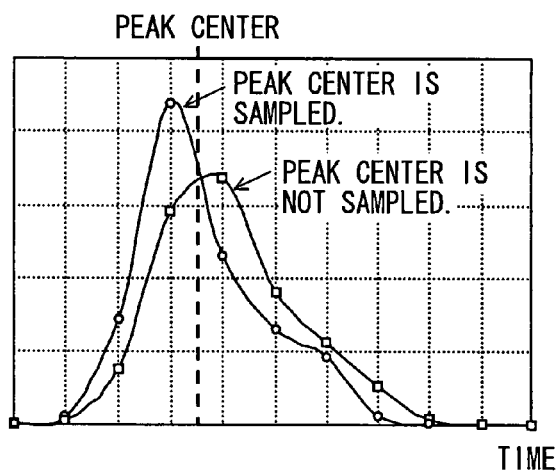
FIG. 6 is a waveform diagram showing a light receiving signal waveform that has been converted to a digital signal in the laser radar sensor.
Figure 14:
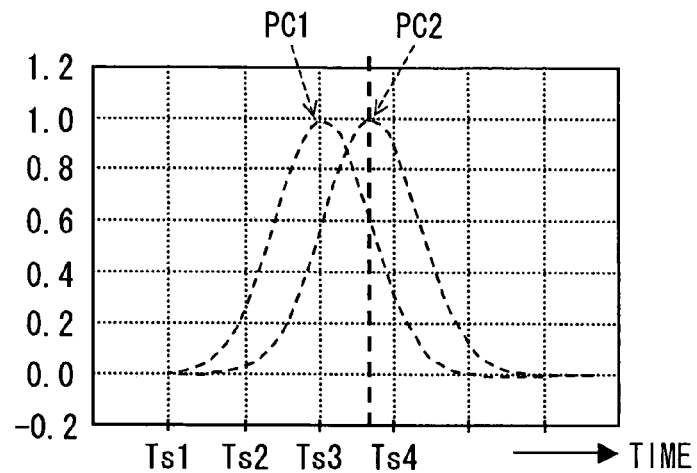
FIG. 14 is a graph showing a waveform whose peak center coincides with the sampling point and a waveform whose peak center does not coincide with the sampling point at the same time.

FIG. 6 shows the configuration of an exemplary light receiving signal waveform that has been converted into the digital signal in the laser radar sensor 5. The left waveform in FIG. 6 is the light receiving signal waveform that is actually observed by the laser radar sensor 5. The actual light receiving signal waveform is not symmetric with respect to the peak center as with the Gauss waveform, but has such a characteristic that the slope of the trailing portion changes slower than that of the left leading portion with respect to the peak center. This characteristic deviates from the characteristic unique to the light receiving element 83 and the circuit configuration following the light receiving element 83. A circuit that ideally operates has the symmetric configuration similar to the Gauss waveform shown in FIG. 14. However, the characteristic of the leading portion of the light receiving signal waveform is actually different from that of the trailing portion.

Figure 7A:
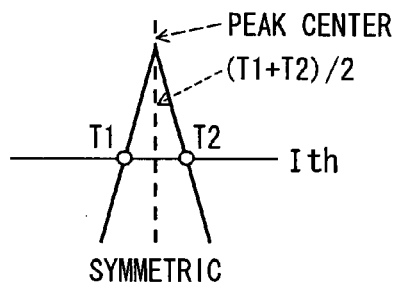
FIG. 7A is an enlarged waveform diagram showing a symmetric waveform.
Figure 7B:
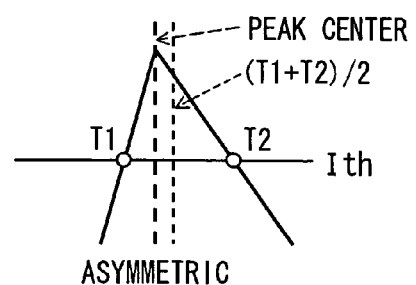
FIG. 7B is an enlarged waveform diagram showing an asymmetric waveform.

Accordingly, the actual light receiving signal waveform shown in FIG. 6 is not symmetric with respect to the peak center, and the peak center estimate time that is calculated from this waveform does not coincide with the actual peak center, and deviates from thee actual peak center toward the right side. For example, as shown in FIG. 7A, in the case of the symmetric waveform, the peak center estimate time that is calculated by the above Expression 11 coincides with the actual peak center. However, as shown in FIG. 7B, in the case of the asymmetric waveform, the peak center estimate time that is calculated by the above Expression 11 does not coincide with the actual peak center.

Figure 15:
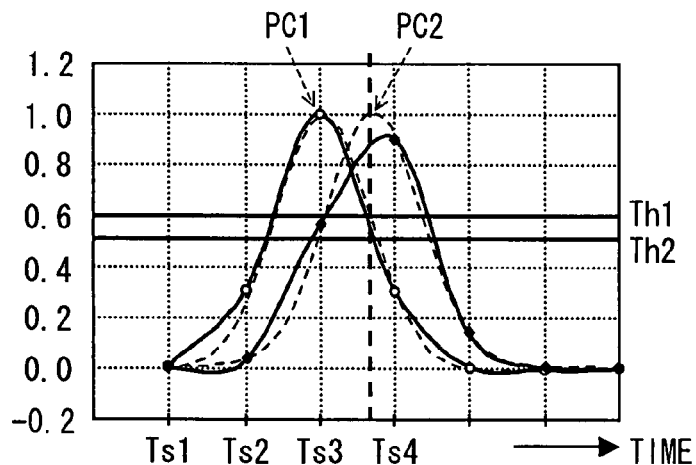
FIG. 15 is a graph showing a waveform that connects A/D conversion results by an interpolation curve, and an original waveform that has not yet been subjected to A/D conversion at the same time.

The right waveform in FIG. 6 is the sampling results in the case where the peak center generation time deviates from the sampling of the A/D conversion section 87. As in the case described with reference to the Gauss waveform in FIG. 15, the results of the waveform that remarkably deviates from the original waveform are sampled.

Figure 8:
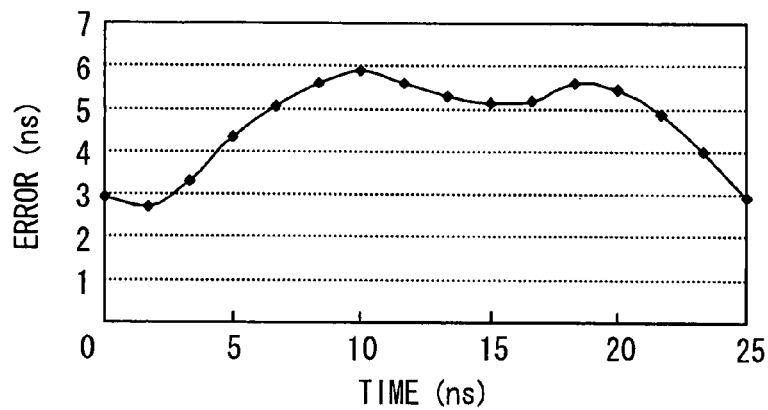
FIG. 8 is a diagram showing an error curve representative of a relationship between a deviation time between an actual peak center generation time and a peak center estimate time, and a sampling time of the A/D converter.
Figure 16:
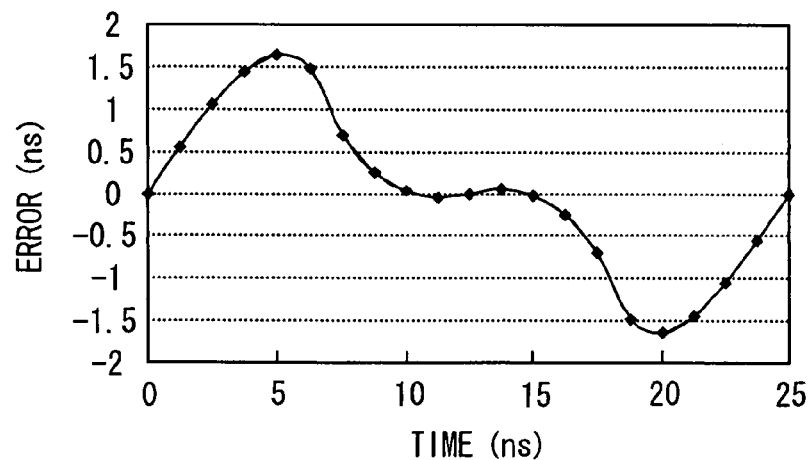
FIG. 16 is a diagram showing a relationship between a deviation between the peak center estimate time and the actual peak center time, with respect to the sampling time.

FIG. 8 shows an error curve representative of a relationship between a deviation (error) time between the actual peak center generation time and the peak center estimate time (the peak center estimate time with respect to the actual peak center generation time), and the sampling time of the A/D converter 87 by using the left waveform shown in FIG. 6, as in FIG. 16. In FIG. 8, calculation is conducted under the conditions where a value of k in the above Expression 8 is 0.625, and the sampling frequency is 40 [MHz] (a period of 25 [ns]) as in FIG. 16.

The error curve shown in FIG. 8 is theoretically calculated by using the above Expressions 8 to 11 on the basis of the original waveform configuration (the left waveform in FIG. 6). That is, when the waveform configuration of the light receiving signal in the radar apparatus is known, the error curve in FIG. 8 can be calculated. Also, even if the light reflectivity of the reflective object changes, the peak height (light receiving signal intensity) of the left waveform shown in FIG. 6 only changes, and the light receiving signal waveform changes without changing the configuration obtained by multiplying the original configuration by a given coefficient corresponding to the light reflectivity. Therefore, in the peak center detection section 88, the peak center estimate time that is estimated by calculating the above Expressions 8 to 11, and the error curve in FIG. 8 which is theoretically calculated from the above Expressions 8 to 11 do not change when the waveform configuration of the light receiving signal is constant. In the case where the light receiving element 83 and the circuit configuration following the light receiving element 83 change, the error curve can be theoretically found on the basis of the above Expressions 8 to 11 when the configuration of the light receiving signal waveform has been observed in advance.

As is apparent from FIG. 8, because the light receiving signal waveform is not symmetric with respect to the peak center, even in the case where the peak centers exist in 0 [ns] and 25 [ns] where sampling is conducted by the A/D conversion section 87, a time deviation (deviation toward a larger time) of about 3 [ns] occurs. When the time deviation is converted into the distance to the reflective object, the distance deviation is about 0.45 [m].

In FIG. 8, the axis of abscissa represents a position (time) at which an actual peak center occurs. In the case where the time on the axis of abscissa is extended to a general time without being limited to a time range of 0 to 25 [ns] which is one sampling time (one period time of sampling), the time on the axis of abscissa can be obtained from Expression indicated below by using the periodicity of the error. In the following expression, MOD(A, B) represents a remainder when A is divided by B (sampling frequency 40 [MHz] corresponds to one sampling time of 25 [ns]).

Time on the axis of abscissa=MOD (actual peak center generation time, one sampling time) (Ex. 12)

When the time on the axis of abscissa which is obtained by the above

Expression 12 is applied to FIG. 8, it is possible to obtain the estimate error of the peak center estimate time in the general time where the peak center exists in a time longer than 25 [ns] which is one sampling time.

When the waveform configuration of the light receiving signal in the radar apparatus is known, since the error curve shown in FIG. 8 is determined, it is possible to calculate a curve having the peak center estimate time which is calculated by the above Expression 11 in the axis of abscissa and a correction time (quality) for correcting the estimate error (canceling the estimate error) in the axis of ordinate. The curve is a correction map for canceling the estimate error that is caused by not allowing the actual peak center to be sampled, and the error in the sampling can be theoretically perfectly suppressed to zero. However, the error in sampling is affected by the A/D conversion error in the A/D conversion section 87 and the noises, there making it impossible to make the error in the sampling perfectly zero. The curve is theoretically calculated by using the above Expressions 8 to 11.

FIG. 9 shows a correction map for correcting the peak center estimate time. The reason that a numeric value of a start point of the curve shown in FIG. 9 on the axis of abscissa does not start from 0 [ns] but starts from about 3 [ns] is because the peak center estimate time at a time when the actual peak center shown in FIG. 8 is sampled by the A/D conversion section 87 is deviated toward 3 [ns] plus side. In other words, this is because even if the actual peak center is sampled by the A/D conversion section 87, because the configuration of the light receiving signal waveform is asymmetric with respect to the peak center, the peak center estimate time includes the error time of 3 [ns].

When a deviation value at the zero point in FIG. 9 (start point 0 [ns] and end point 25 [ns]) is defined as an offset value (in this case, 3 [ns]), a correction amount with respect to the peak center estimate time in the case of a general time that exceeds 25 [ns] can be calculated from FIG. 9 by conducting the following expression conversion with respect to the periodicity.

Time on the axis of abscissa=MOD ({peak center estimate time−offset}, one sampling time)+offset (Ex. 13)

With the peak center estimate time that is calculated from the above expression 13 as a value on the axis of abscissa, the correction amount corresponding to that value is referred to from the graph of FIG. 9, thereby making it possible to obtain the correction amount of the peak center estimate time. More specifically, the graph of FIG. 9 can be stored in the form of a correction data map. The map has input discrete data. Therefore in the case where there is no input value in the map, linear interpolation is conducted to calculate the calculation amount.

Figure 10:
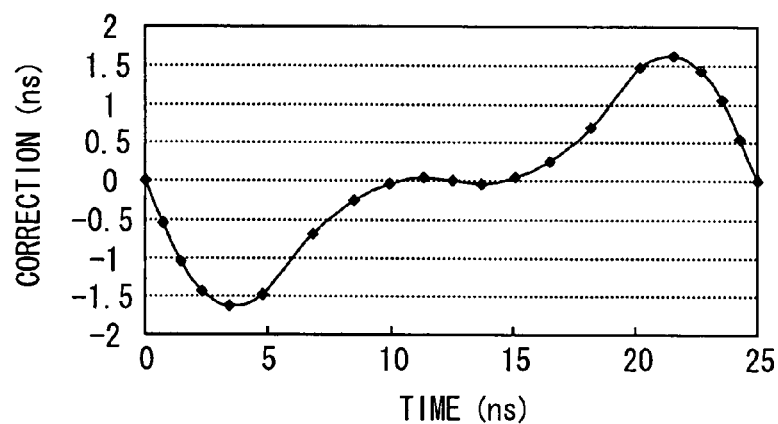
FIG. 10 is a diagram showing a map for calculating the amount of correction in the case where the light receiving signal waveform is a Gauss waveform.
Figure 11:
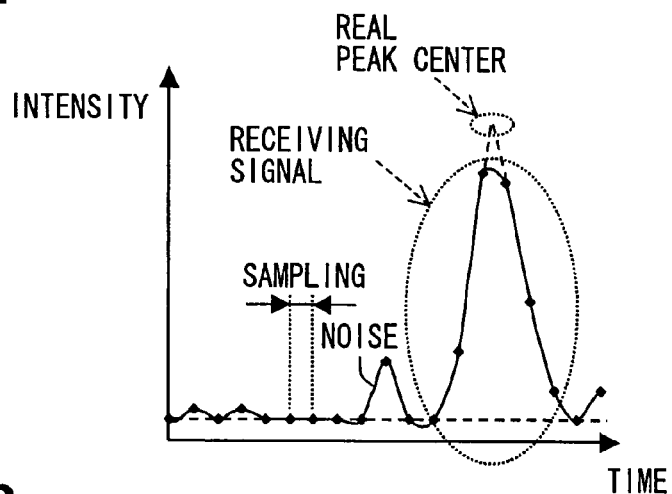
FIG. 11 is a diagram showing plotted A/D conversion results of the light receiving signal.
Figure 12:
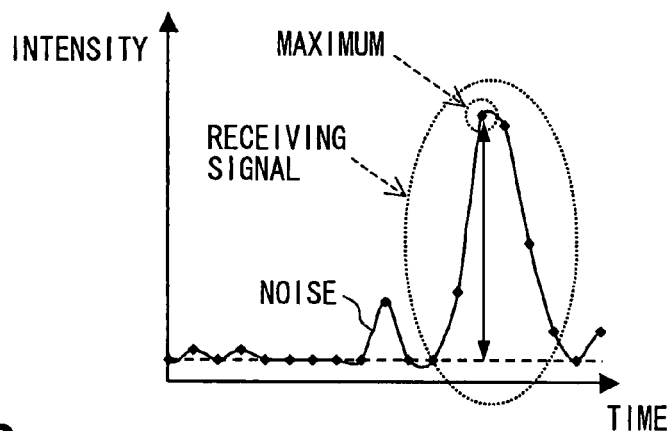
FIG. 12 is a diagram showing the maximum intensity of the A/D conversion results at sampling points of the light receiving signal.
Figure 13:
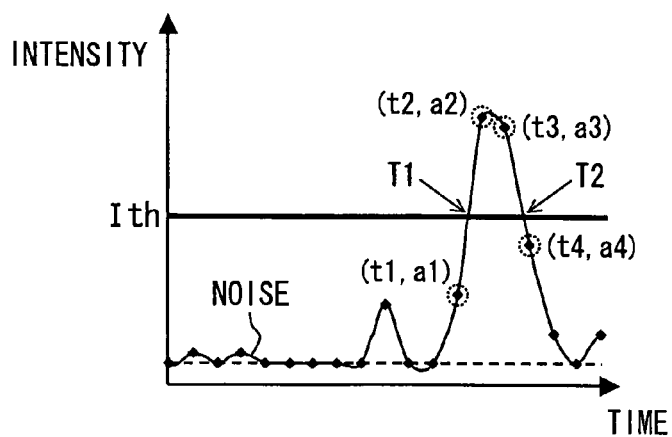
FIG. 13 is a diagram showing two points between which a threshold value resides on a leading portion of the light receiving signal waveform, and two points between which the threshold value resides on a trailing portion of the light receiving signal waveform.

Also, because the offset value and the map shown in FIG. 9 is calculated from the waveform configuration that is determined by the circuit characteristic of the radar apparatus, it is necessary to change the offset value and the map every time the circuit configuration of the radar apparatus is changed. FIG. 10 shows a correction data map for calculating the correction amount in the case where the light receiving signal waveform is a Gauss waveform shown in FIG. 14. The offset value in the case shwon in FIG. 10 is zero (0).

The error correction section 89 calculates the correction peak center estimate time that has been corrected by calculating the following expression with respect to the correction amount that is obtained with reference to the map shown in FIG. 9. When the correction calculation based on the following expression is conducted, it is possible to theoretically make the estimate error of the peak center estimate time which is attributable to sampling zero.

Correction peak center estimate value=Peak center estimate time+Correction amount (Ex. 14)

The distance calculation section 90 shown in FIG. 3 calculates a distance to the reflective object on the basis of a period of time from the laser emission start time to the corrected peak center estimate time by using the corrected peak center estimate time that has been subjected to the error correction in the error correction section 89. The distance to the calculated reflective object is outputted to the laser radar CPU 70 as shown in FIG. 2.

The laser radar CPU 70 produces the position data on the basis of the distance to the reflective object which is inputted from the distance calculation section 90 and the scan angles θx and θy of the corresponding laser beam. More specifically, the position data of the objective object in an X-Y-Z orthogonal coordinate system having an X-axis in the vehicle width direction, a Y-axis in the vehicle height direction, and a Z-axis in the vehicle forward direction is found from the distance and the scan angles θx and θy with the laser radar center as an origin (0, 0, 0). The position data in the X-Y-Z orthogonal coordinate system is outputted to the control ECU 3.

The control ECU 3 recognizes an object on the basis of the distance data from the laser radar sensor 5, and implements inter-vehicle control that controls the vehicle speed by outputting a drive signal to the brake actuator 19, the throttle actuator 21 and the automatic transmission controller 23 according to the status of the preceding vehicle that is obtained from the recognition object. The alarm determination process that issues an alarm in the case where the recognition object exists in a given alarm area for a given period of time is also implemented at the same time. The object in this case falls under a preceding vehicle that travels in front of the subject vehicle, or a preceding vehicle that is stopping in front of the subject vehicle.

The internal configuration of the control ECU 3 will be briefly described as control function section. The ranging data that has been outputted from the laser radar sensor 5 is transmitted to an object recognition section 43. The object recognition section 43 finds the center position (X, Y, Z) of the object, and the sizes (W, D, H) of the object such as a width W, a depth D, and a height H on the basis of three-dimensional position data that is obtained as the ranging data. In addition, a relative speed (Vx, Vy, Vz) of the object relative to a position of the subject vehicle on the basis of the temporal change of the center position (X, Y, Z). Further, the object recognition section 43 determines whether the object is a stop object or a traveling object, or not, according to the vehicle speed (subject vehicle speed) that is outputted from the vehicle speed calculation section 47 on the basis of the detection value of the vehicle speed sensor 7, and the relative speed (Vx, Vy, Vz) obtained as described above. An object that affects the travel of the subject vehicle is selected on the basis of the recognition results and the center position of the object, and the distance is displayed by the distance indicator 15.

Also, a steering angle is found by a steering calculation section 49 on the basis of a signal from a steering sensor 27, and a yaw rate is calculated by a yaw rate calculation section 51 on the basis of the signal from the yaw rate sensor 28. A curve radius (radius of curvature) calculates a curve radius (radius of curvature) calculation section 57 calculates a curve radius (radius of curvature) R on the basis of the vehicle speed from the vehicle speed section 47, the steering angle from the steering angle calculation section 49, and the yaw rate from the yaw rate calculation section 51. The object recognition section 43 determines the probability that the object is a vehicle, and the probability that the object travels on the same lane as the subject vehicle. A sensor abnormality detection section 44 detects whether data obtained by the object recognition section 43 is a value within an abnormal range, or not. In the case where the value is within the abnormal range, this fact is indicated on the sensor abnormality indicator 17.

On the other hand, the preceding vehicle determination section 53 selects the preceding vehicle on the basis of various data that have been obtained from the object recognition section 43, and finds the distance Dz and the relative speed Vz with respect to the preceding vehicle, which is in the Z-axis direction. Then, an inter-vehicle control section and an alarm determination section 55 determines whether alarm is conducted, or not. When alarm determination is made, on the basis of the distance Dz to the preceding vehicle, the relative speed Vz, the setting state of the cruise control switch 26, the depression state of the brake switch 9, the throttle operation degree from the throttle sensor 11, and a sensitivity setting value obtained by the alarm sensitivity setter 25. When the cruise determination is made, the inter-vehicle control and alarm determination section 55 determines the contents of the vehicle speed control. When alarm is necessary from the results, the inter-vehicle control and alarm determination section 55 outputs an alarm generation signal to the alarm generator 13. When the cruise determination is made, the inter-vehicle control and alarm determination section 55 outputs a control signal to the automatic transmission controller 23, the brake actuator 19, and the throttle actuator 21 to implement necessary control. During the execution of those controls, the inter-vehicle control and alarm determination section 55 outputs a necessary display signal to the distance indicator 15, and notifies a driver of the status.

As described above, the radar apparatus corrects the estimate error of the peak center estimate time which occurs in the case where the peak width of the peak waveform of the light receiving signal is narrower than the sampling period of the A/D conversion section 87, and sampling is not conducted at the fine sampling intervals sufficient to realize the peak waveform.

That is, there is provided the error correction section 89 that corrects the estimate error of the peak center estimate time that occurs when the generation time of the actual peak center in the light receiving signal is deviated from sampling of the A/D conversion section 87. The distance to the reflective object is calculated on the basis of the corrected peak enter estimate time that has been corrected by the error correction section 89. As a result, even if the estimate error of the peak center estimate time occurs by deviating the generation time of the actual peak center in the light receiving signal from sampling of the A/D conversion section 87, it is possible to correct the estimate error. As a result, it is possible to prevent the distance error that is caused by the not fine of sampling in the A/D conversion from varying depending on the object to be detected.

The above embodiment may be modified in many ways as exemplified below.

(First Modification)

In FIG. 3, all of the processing of the peak center detection section 88, the error correction section 89, and the distance calculation section 90 can be executed by the laser radar CPU 70. Also, in the case where the processing performance of the laser radar CPU 70 is insufficient, and it is necessary to execute the detection and error correction of the peak center estimate time at a higher speed, those processing can be realized by hardware (dedicated IC or FPGA).

(Second Modification)

Between the A/D conversion section 87 and the peak center detection section 88, a setting section and an integration section may be provided. The setting section sets a light receiving signal range to be integrated which consist of the light receiving signals that have been converted into digital signals by a given number of AD conversion sections 87, which correspond to a given number transmitting waves that are irradiated adjacently from the laser radar sensor 5. The setting section sets plural light receiving signal ranges to be integrated while shifting the light receiving signals that belongs to the light receiving signal ranges by the smaller number than the given number so that parts of the light receiving signals redundantly belong to the plural light receiving ranges to be integrated. The integration section integrates the light receiving signals that have been converted into the digital signals by a given number of A/D conversion sections 87 that belong to the plural set light receiving signal ranges to be integrated, respectively, and outputs an integrated light receiving signal.

With the above configuration, even if the intensities of the respective light receiving signal components are small, the given number of light receiving signals are integrated together to amplify the intensity of the light receiving signal component corresponding to the reflected wave from the reflective object. On the other hand, because the noise components that are superimposed on the light receiving signal are random due to diverse factors, even if a given number of light receiving signals are integrated together, the amplification degree of the noise components is small. For that reason, in the integrated light receiving signal, the S/N ratio of the light receiving signal component corresponding to the reflected wave from the reflected object is improved.

(Third Modification)

In the case where the laser radar sensor 5 irradiates the transmitting wave toward a given angle within a given angle range, an integration section can be disposed between the A/D conversion section 87 and the peak center detection section 88. The integration section integrates a plurality of light receiving signals that have been converted into the digital signals by the A/D conversion section 87 which correspond to the plurality of light receiving signals outputted from the light receiving section to output the integrated light receiving signal. With the above configuration, it is possible to improve the S/N ratio of the light receiving signal component corresponding to the reflected wave from the reflective object in the integrated light receiving signal.

(Fourth Modification)

The polygon mirror 73 that is different in the slant angle of mirror planes is employed in order to conduct the two-dimensional scan of the laser beam. Alternatively, the same effect can be realized by, for example, a mechanism that employs a galvanic mirror that can scan in the vehicle width direction, and can change the slant angle of the mirror planes. The use of the polygon mirror 73 is advantageous in that the two-dimensional scan can be realized by only rotation drive.

(Fifth Modification)

In place of the laser beam of the laser radar sensor, electric waves such as millimeter waves can be employed. The present invention is not limited to the scan system, and is applicable to any systems that are capable of measuring the orientation other than the distance. For example, in the case of using an FMCW radar or a Doppler radar with millimeter waves, information on the distance to the preceding vehicle from the reflected wave (receiving wave) and information on the relative speed of the preceding vehicle are obtained at the same time. Therefore, no process of calculating the relative speed on the basis of the distance information is required as in the case of using the laser beam.

(Sixth Modification)

The radar apparatus is not limited to the vehicle radar, but can be used, for example, to detect an invader into a given area.

What is claimed is:

1. A radar apparatus comprising:
    radar means configured for irradiating a transmitting wave in a given angle area, receiving a reflected wave of the transmitting wave reflected by a reflective object, and outputting a receiving signal corresponding to an intensity of the reflected wave;
    A/D converting means configured for sampling the receiving signal at a predetermined sampling frequency and converting the sampled receiving signal into a digital signal;
    peak center estimating means configured for estimating a peak center generation time in the receiving signal by using a plurality of digital signals produced by the A/D converting means;
    estimate error correcting means configured for correcting an estimate error of a peak center estimate time indicative of the peak center generation time and producing a corrected peak center estimate time, the estimate error being caused by deviation of the peak center generation time in the receiving signal outputted from the radar means from sampling time of the A/D converting means; and
    distance calculating means configured for calculating a distance to the reflective object on the basis of the corrected peak center estimate time that is estimated by the peak center estimating means and corrected by the estimate error correcting means.

2. The radar apparatus according to claim 1, wherein the estimate error correcting means calculates a correction time for correcting the estimate error of the peak center estimate time on the basis of a relationship between the error time of the peak center estimate time with respect to the peak center generation time in the receiving signal and the sampling time of the A/D converting means in the case where a waveform configuration of the receiving signal outputted from the radar means is well known.

3. The radar apparatus according to claim 1, wherein the peak center estimating means:
    detects a maximum value of the receiving signal that is converted into the digital signal by the A/D converting means;
    sets a threshold value obtained by multiplying the maximum value by a coefficient that is lower than 1; and
    calculates a leading time and a trailing time of the receiving signal waveform at which the receiving signal waveform converted into the digital signal crosses the threshold value,
    wherein the peak center estimating means estimates the peak center estimate time on the basis of the leading time and the trailing time.

4. The radar apparatus according to claim 1, wherein:
    the radar means irradiates a plurality of transmitting waves toward different directions within the given angle area;
    a receiving signal range to be integrated is set, the range being formed by receiving signals converted into digital signals by a given number of A/D conversions corresponding to a given number of transmitting waves that are adjacently irradiated from the radar means to set a plurality of receiving signal ranges to be integrated while shifting the receiving signals that belong to the receiving signal ranges to be integrated by a number smaller than the given number so that parts of the receiving signals redundantly belong to the plurality of receiving signal ranges to be integrated; and
    the receiving signals are integrated to output an integrated receiving signal, the receiving signals being are converted into the digital signals by the given number of A/D conversions that belong to the plurality of receiving signal ranges.

5. The radar apparatus according to claim 1, wherein a plurality of receiving signals converted into the digital signals by the A/D converting means is integrated, so that an integrated receiving signal is output.

6. The radar apparatus according to claim 1, wherein the estimate error correcting means is configured for correcting the estimate error of the peak center estimate time in accordance with the predetermined sampling frequency.

7. The radar apparatus according to claim 2, wherein the estimate error correcting means is configured for calculating the corrected peak center estimate time by adding the correction time to the peak center estimate time calculated by the peak center estimating means.

8. A radar apparatus comprising:

radar means for irradiating a transmitting wave in a given angle area, receiving a reflected wave of the transmitting wave reflected by a reflective object, and outputting a receiving signal corresponding to an intensity of the reflected wave;

A/D converting means for sampling the receiving signal and converting the sampled receiving signal into a digital signal;

peak center estimating means for estimating a peak center generation time in the receiving signal that is converted into the digital signal by the A/D converting means;

distance calculating means for calculating a distance to the reflective object on the basis of a peak center estimate time that is estimated by the peak center estimating means; and estimate error correcting means for correcting an estimate error of the peak center estimate time, which is caused by deviation of the peak center generation time in the receiving signal outputted from the radar means from sampling time of the A/D converting means; wherein the radar means irradiates a plurality of transmitting waves toward different directions within the given angle area;

a receiving signal range to be integrated is set, the range being formed by receiving signals converted into digital signals by a given number of A/D conversions corresponding to a given number of transmitting waves that are adjacently irradiated from the radar means to set a plurality of receiving signal ranges to be integrated while shifting the receiving signals that belong to the receiving signal ranges to be integrated by a number smaller than the given number so that parts of the receiving signals redundantly belong to the plurality of receiving signal ranges to be integrated; and the receiving signals are integrated to output an integrated receiving signal, the receiving signals being are converted into the digital signals by the given number of A/D conversions that belong to the plurality of receiving signal ranges.

9. A radar apparatus comprising:

radar means for irradiating a transmitting wave in a given angle area, receiving a reflected wave of the transmitting wave reflected by a reflective object, and outputting a receiving signal corresponding to an intensity of the reflected wave;

A/D converting means for sampling the receiving signal and converting the sampled receiving signal into a digital signal;

peak center estimating means for estimating a peak center generation time in the receiving signal that is converted into the digital signal by the A/D converting means;

distance calculating means for calculating a distance to the reflective object on the basis of a peak center estimate time that is estimated by the peak center estimating means;

estimate error correcting means for adjusting the peak center estimate time by a correction amount, which is caused by deviation of the peak center generation time in the receiving signal outputted from the radar means from sampling time of the A/D converting means.

* * * * *